United States Patent [19]

Bruni

[11] Patent Number: 4,831,919
[45] Date of Patent: May 23, 1989

[54] ASYMMETRIC OVAL PISTON WITH HIGHER CONVEXITY THRUST FACE

[75] Inventor: Ludovico Bruni, Turin, Italy

[73] Assignee: AE PLC, Rugby, England

[21] Appl. No.: 882,717

[22] Filed: Jul. 7, 1986

[30] Foreign Application Priority Data

Jul. 12, 1985 [IT] Italy ................ 67640 A/85

[51] Int. Cl.$^4$ .............. F02F 3/28; F16J 1/02
[52] U.S. Cl. ................ 92/233; 123/193 P; 29/156.5 R
[58] Field of Search ........... 92/233, 214; 277/217; 123/193 P; 29/156.5 R

[56] References Cited

U.S. PATENT DOCUMENTS

| | | | |
|---|---|---|---|
| 1,502,765 | 7/1924 | Covert | 92/233 X |
| 1,758,444 | 5/1930 | Jehle et al. | 92/233 X |
| 1,939,778 | 12/1933 | Jardine | 92/233 |
| 2,044,074 | 6/1936 | Jardine | 92/233 X |
| 2,309,555 | 1/1943 | Venner et al. | 92/233 |
| 2,513,814 | 7/1950 | Moore | 92/233 X |
| 2,563,887 | 8/1951 | Townhill | 92/233 X |
| 2,795,468 | 6/1957 | Venner et al. | 92/233 X |
| 2,911,269 | 11/1959 | Jubel | 92/233 X |
| 4,302,992 | 12/1981 | Skrentner | 82/19 |

FOREIGN PATENT DOCUMENTS

| | | | |
|---|---|---|---|
| 18/36 | 1/1935 | Australia | 92/233 |
| 3022858 | 12/1981 | Fed. Rep. of Germany . | |
| 14164 | 7/1969 | Japan | 123/193 P |
| 81143 | 5/1982 | Japan | 123/193 P |
| 456792 | 11/1936 | United Kingdom | 92/233 |

Primary Examiner—Robert E. Garrett
Assistant Examiner—George Kapsalas
Attorney, Agent, or Firm—William R. Hinds

[57] ABSTRACT

Pistons are described having oval polar profiles or both oval polar profiles and axial profiles machined to asymmetric curvatures about the plane which includes both the piston axis and the minor axis over at least a part of the skirt length, the asymmetry of the polar profile comprising a greater convexity about the major axis on the thrust face over at least part of the axial length of the skirt region.

5 Claims, 2 Drawing Sheets

ASYMMETRIC OVAL PISTON WITH HIGHER CONVEXITY THRUST FACE

BACKGROUND OF THE INVENTION

The present invention relates to pistons and particularly to pistons for internal combustion engines.

Broadly speaking a piston may be categorised into two regions; the crown and piston ring belt forming one region and the skirt including the gudgeon pin bosses forming the second region.

When being machined to final shape the crown and ring belt region is usually machined to a circular polar profile. There are, however, exceptions; specific designs of some engines having deviations from this generalisation. The skirt region, however, is generally neither circular in polar profile nor linear in axial profile.

The skirt region is often machined on a cam turning machine to an oval polar profile. One example of such an oval polar profile is an ellipse where the minor diameter is parallel to the gudgeon pin axis and the major diameter lies in a direction at right-angles to the gudgeon pin axis. The ovality of a piston may be defined as the difference between the dimension of the major diameter and that of the minor diameter. The resulting figure of ovality, however, only gives the maximum deviation from a true circular polar profile and gives no indication of the shape of the curve between the major and minor diameters. Any given ovality figure could in theory be applied to an infinite number of different curves.

The reasons for machining piston skirts to shapes other than circular in polar profile include some based on thermal considerations and others based on dynamic considerations relating to the environment in which the piston operates.

Since for practical reasons pistons may only be economically produced by machining at ambient temperatures the form to which a piston is machined is an attempt to compensate for the thermal distortion which occurs during heat-up to and dynamic operation at the normal running temperature of the piston. Such distortion may be anything but uniform and will be greatly influenced by the temperature variations which occur within the piston itself. Temperatures will be higher nearer to the crown and lower at the lower skirt portions. Furthermore, the changes of section thickness in the skirt region will also influence the manner and degree of the distortion and will vary from the thin sections of the skirt per se to the thicker, stiffer regions around the pin boss and ring belt.

The dynamic considerations to be made stem from the stress/strain effects during operation of the engine. The forces acting on the piston are generally at a mximum during the power stroke of the engine during combustion of the fuel. The forces due to combustion are borne mainly on one side of the piston known as the thrust face of the piston. The forces generated in the remainder of the cycle are much lower and are borne both by the thrust face and the other side of the piston which is known as the counter-thrust face. These forces are not necessarily, however, spread evenly between the thrust and counter-thrust faces of the piston.

The curvature to which the piston is machined generally attempts to produce in the running engine a "bedding" or contact area between the piston and its associated cylinder wall which lies within an arc subtending between approximately 40° and 80° on the thrust and counter-thrust faces of the piston.

Heretofore piston skirts have been machined symmetrically about the plane which includes both the piston and the minor axis. The curvature of the piston skirt has generally been calculated to produce the desired bedding area to accommodate the combustion generated forces on the thrust face of the piston. It has now been discovered that significant improvements in, for example, noise reduction, stability and scuffing between a piston and its associated cylinder wall may be obtained by machining non-symmetrically about the plane which includes both the piston axis and the minor axis.

SUMMARY OF THE INVENTION

According to the present invention there is provided a piston having a crown and piston-ring belt region and a skirt region having over at least a part of the axial length of the skirt region asymmetrical curvatures of the polar profile of the skirt about a plane which includes both the piston axis and the minor axis, the asymmetrical curvature of the polar profile being such that over at least part of the axial length of the skirt region the thrust face has a curvature in a polar plane of greater convexity about the major axis than the curvature of the counter-thrust face in the same polar plane about the major axis.

Also according to the present invention there is provided a method of optimising performance with respect to one or more of stability, noise, scuffing and wear of a piston comprising a crown and ring belt region and a skirt region, the method consisting of the steps of machining the thrust and counter-thrust faces of the piston skirt to asymmetric polar profiles about the plane which includes both the piston axis and the minor axis over at least a part of the skirt length, the asymmetrical curvature of the polar profile being such that over at least part of the axial length of the skirt region the thrust face has a curvature in a polar plane of greater convexity about the major axis than the curvature of the counter-thrust face in the same polar plane about the major axis.

The plane which includes both the piston axis and the minor axis may also include the gudgeon pin axis.

The degree of asymmetry to which the piston skirts are machined may also vary along the axial length of the piston skirt. Furthermore, in addition to the polar profile of the piston skirt being assymetric the axial length of at least part of the piston skirt portion may also be formed to a convex curvature. Such axial curvature may be either symmetrical about the axial plane which includes both the piston axis and the minor axis or may be asymmetrical, i.e. the curvature either side of the axial plane may be different at any given polar plane.

Pistons according to the invention may be conveniently visualised as having ovoid-shaped polar profiles. The concept of an ovoid-shaped piston is of course greatly exaggerated but nevertheless the general idea of the piston polar profile having a relatively high convexity (or low radius of curvature) on one working face and a relatively low convexity (or high radius of curvature) on the other working face is applicable.

It is also envisaged that the pistons may have skirts wherein the relative orientation of the ovoid shape with respect to thrust and counter-thrust side changes within a single piston. For example, at the lower end of the skirt the polar profile may have the lower convexity on the thrust side whilst at the top of the skirt near to the ring belt the higher convexity profile may be on the thrust side with the curvature gradually changing over along the skirt lengths.

With respect to the axial profile in, for example, the piston skirt near to the piston ring belt region the convexity may, for example, generally be lower on the thrust side than on the counter-thrust side. The physical manifestation of this is that the radial dimension which is measured normal to the plane which includes both the piston axis and the gudgeon pin axis to the outer skirt wall in the relevant polar plane is greater on the thrust side than on the non-thrust side. In some engine designs, however, superior performance may be obtained with these parameters reversed.

Preferably pistons according to the invention may have the intervening skirt portions between the working faces relieved in some manner such as, for example, by machining or utilising piston castings having cast-in skirt relief. Generally speaking the polar profile of the intervening skirt between the working faces is immaterial provided that contact with the cylinder bore does not occur in places where contact is undesirable.

BRIEF DESCRIPTION OF THE DRAWINGS

In order that the invention may be more fully understood examples of pistons will now be given by way of illustration only with reference to the accompanying drawings, of which.

DETAILED DESCRIPTION OF THE PREFERRED EMBODIMENTS

Figure 1:
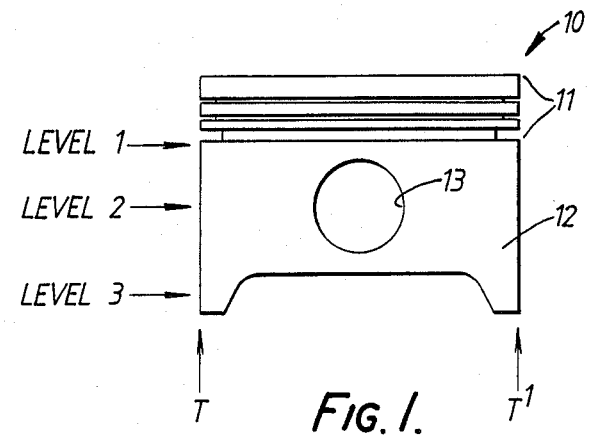
FIG. 1 shows an elevation of a schematic piston indicating the various regions.

Referring now to the figures and where in FIG. 1 a piston is indicated generally at 10. The piston comprises a crown and ring belt region 11 and a skirt region 12 also including the gudgeon pin boss region 13. For the purposes of illustration the skirt 12 may be sub-divided into three levels; Level 1 lying just below the ring belt 11, Level 3 lying near the lower end of the skirt and Level 2 lying between Levels 1 and 3 approxmately coplanar with the gudgeon pin axis for convenience and for no other specific reason. The thrust face is denoted by T and the counter-thrust face by $T^1$.

Figure 2:
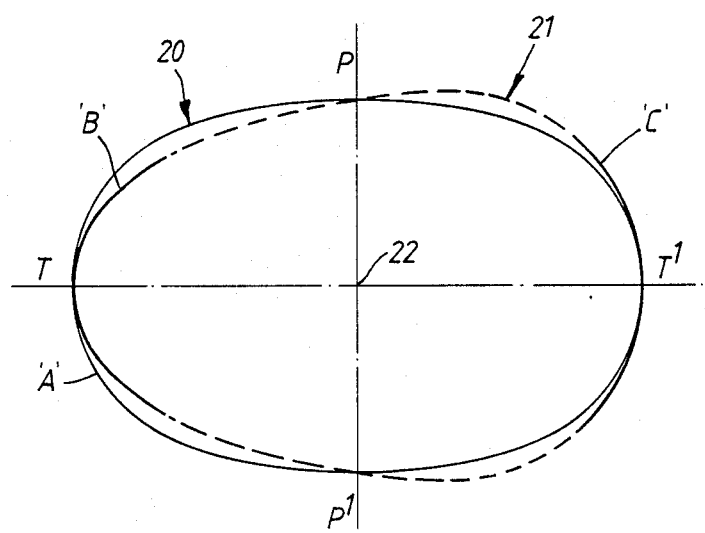
FIG. 2 shows a diagrammatic comparison, greatly exaggerated, of a polar profile through a prior art piston and one polar profile through a piston according to the present invention.

FIG. 2 shows a greatly exaggerated representation of a skirt profile through one polar plane. Profile 20 is typical of a conventional prior art piston, the oval shape 20 being symmetrical about both the major axis $TT^1$ and the minor axis $PP^1$. Profile 21 shows one plane through a piston according to the invention. As may be seen the curvature of the thrust face T is of high convexity and that of the counter-thrust face $T^1$ is of lower convexity.

Figure 3:
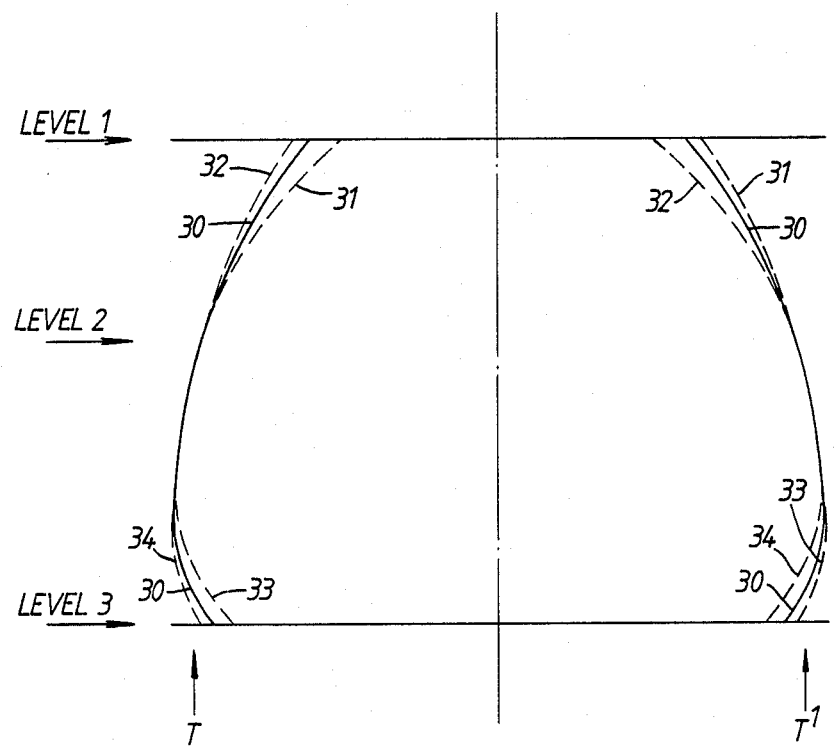
FIG. 3 shows a diagrammatic comparison, greatly exaggerated, between a prior art piston axial profile and alternative axial profiles of a piston according to the present invention.

FIG. 3 shows a greatly exaggerated representation of the axial skirt profile. The profile shown by the lines 30 represents a conventional symmetrical piston having what is known as a "barrelled" profile. The degree of barrelling varies from piston to piston and will depend upon the specific design thereof for the engine application. A piston according to the invention may have an axial profile shown by the dashed lines 31 or with a profile indicated by dashed lines 32 between levels 1 and 2. The effect of this would be to offset the polar profile 21 of FIG. 2, for example, either slightly to the thrust or non-thrust side depending upon the specific piston. Such asymmetries may also be included at the lower skirt regions around Level 3 and further schematic examples of such asymmetries are given by dashed lines 33 and 34. Asymmetry may also be incorporated if appropriate at any axial level including Level 2.

During operation of the piston in the engine the stresses imposed by combustion are much higher on the thrust face T. Therefore, the convexity is higher so that the piston skirt may deform against its associated cylinder wall to provide an optimum bedding or contact area. the stresses on the counter-thrust face $T^1$ are much lower and, therefore, if the convexity of face T were applied to face $T^1$ the bedding or contact area between skirt and wall would be much less leading, in some engines, to piston instability. A low convexity profile is, therefore, adopted on face $T^1$ to increase bedding area and promote piston stability and hence increase performance and reduce noise. The dotted portions of the curve 21 represent portions of the piston skirt which are relieved or removed either by machining or by having cast-in relieved panels for example. The bedding area is approximately represented by the solid portions of the curve 21 and lies, in a real piston, approximately within arcs subtending between 20° and 40° either side of the major axis $TT^1$ measured from the piston axis 22.

The types of curve shown in FIG. 2 may be denoted by 'A' for the curvature of a typical symmetrical type oval piston, 'B' for the relatively higher convexity portion of curve 21 and 'C' for the lower convexity portion of curve 21.

The complete symmetrical profile 20 may be regarded as a reference profile applicable to a typical conventional piston. The actual shape of the curve 'A' may be combined in one polar plane with a shape of type B or C to form a piston according to the present invention. For the purposes of clarification it should be noted that the curved shapes A, B and C only denote relative curvatures and not absolute curvatures. Thus a conventional piston may, for example, comprise curves of type B in the same polar planes on both thrust and counter-thrust faces along the axial length of the skirt.

Depending upon the requirements of a particular piston the various type of curvature typified in FIG. 2 may be incorporated into the skirt in any desired combination as indicated in the table below.

| Face (See FIG. 1) | Polar Shapes (See FIG. 2) Level (see FIG. 1.) | | | |
|---|---|---|---|---|
| | 1 | 2 | 3 | |
| T | A | A | A | Conventional piston |
| $T^1$ | A | A | A | |
| T | B | B | B | |
| $T^1$ | A | A | A | |
| T | A | A | A | |
| $T^1$ | C | C | C | |
| T | B | A | C | |
| $T^1$ | A | A | A | |
| T | B | A | C | |
| $T^1$ | C | A | B | |
| T | C | A | B | |
| $T^1$ | A | A | A | |
| T | C | A | B | |
| $T^1$ | B | A | C | |

| Face (See FIG. 1) | Polar Shapes (See FIG. 2) Level (see FIG. 1.) | | |
|---|---|---|---|
| | 1 | 2 | 3 |
| | Etc. | | |

The principles disclosed in the present invention may be applied to almost any piston design to optimise the bedding areas on the piston working face.

I claim:

1. A piston having a crown and piston-ring belt region and a skirt region having over at least a part of the axial length of the skirt region asymmetrical curvatures of the polar profile of said skirt about a plane which includes both the piston axis and the minor axis, the asymmetrical curvature of the polar profile being such that over at least part of the axial length of the skirt region the thrust face has a curvature in a polar plane of greater convexity about the major axis than the curvature of the counter-thrust face in the same polar plane about the major axis.

2. A piston as claimed in claim 1 wherein the axial profile of said skirt region is asymmetrical over at least a part of the skirt axial length about the plane which includes both the piston axis and the minor axis.

3. A piston according to claim 1 and wherein the gudgeon pin axis also lies in the plane which includes both said piston axis and said minor axis.

4. A method of optimising performance with respect to one or more of stability, noise, scuffing and wear of a piston comprising a crown and ring belt region and a skirt region, the method consisting of the steps of machining the thrust and counter-thrust faces of the piston skirt to asymmetric polar profiles about the plane which includes both the piston axis and the minor axis over at least a part of the skirt length, the asymmetrical curvature of the polar profile being such that over at least part of the axial length of the skirt region the thrust face has a curvature in a polar plane of greater convexity about the major axis than the curvature of the counter-thrust face in the same polar plane about the major axis.

5. A method as claimed in claim 4 further comprising machining at least part of the axial length of said skirt region to an asymmetric axial profile about the plane which includes both the piston axis and the minor axis.

* * * * *